(12) United States Patent
Chen et al.

(10) Patent No.: US 7,760,310 B2
(45) Date of Patent: Jul. 20, 2010

(54) LIQUID CRYSTAL DISPLAY PANEL WITH V-SHAPED CONNECTION PATTERN CONNECTING A PART OF THE FIRST STRIP PATTERNS AND THE FIRST INTERLACING PATTERN OF THE FIRST PIXEL ELECTRODE

(75) Inventors: Chieh-Wei Chen, Hsinchu (TW); Te-Wei Chan, Hsinchu (TW); Jenn-Jia Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 136 days.

(21) Appl. No.: 11/960,739

(22) Filed: Dec. 20, 2007

(65) Prior Publication Data

US 2009/0086144 A1    Apr. 2, 2009

(30) Foreign Application Priority Data

Sep. 28, 2007    (TW) .............................. 96136238 A

(51) Int. Cl.
*G02F 1/1343*    (2006.01)
*G02F 1/1337*    (2006.01)

(52) U.S. Cl. ...................... 349/143; 349/129; 349/141; 349/142; 349/144

(58) Field of Classification Search ................ 349/141, 349/142, 139, 129, 130, 143, 144
See application file for complete search history.

(56) References Cited

U.S. PATENT DOCUMENTS

2006/0203166 A1*  9/2006  Inoue et al. ................. 349/129
2007/0103607 A1   5/2007  Hanaoka et al.

FOREIGN PATENT DOCUMENTS

CN           1469176          1/2004

* cited by examiner

*Primary Examiner*—Andrew Schechter
*Assistant Examiner*—Dennis Y Kim
(74) *Attorney, Agent, or Firm*—Jianq Chyun IP Office

(57) ABSTRACT

A liquid crystal display (LCD) panel including a first substrate, a plurality of scan lines, a plurality of data lines, a plurality of pixel structures, a second substrate, and a liquid crystal layer is provided. The scan lines, data lines, and pixel structures are disposed on the first substrate. The pixel structures are electrically connected to the corresponding scan lines and data lines. The liquid crystal layer is disposed between the first and the second substrates. Each pixel structure includes a first active device, a first pixel electrode electrically connected to the first active device, and a second pixel electrode. A V-shaped main slit formed between the first and the second pixel electrodes has a tip and two branches connected thereto. The tip of the V-shaped main slit directs towards the second pixel electrode. The edges of the first and the second pixel electrodes adjoining each branch are substantially parallel.

20 Claims, 6 Drawing Sheets

LIQUID CRYSTAL DISPLAY PANEL WITH V-SHAPED CONNECTION PATTERN CONNECTING A PART OF THE FIRST STRIP PATTERNS AND THE FIRST INTERLACING PATTERN OF THE FIRST PIXEL ELECTRODE

CROSS-REFERENCE TO RELATED APPLICATION

This application claims the priority benefit of Taiwan application serial no. 96136238, filed on Sep. 28, 2007. The entirety of the above-mentioned patent application is hereby incorporated by reference herein and made a part of this specification.

BACKGROUND OF THE INVENTION

1. Field of the Invention

The present invention relates to a display panel, and more particularly to a liquid crystal display (LCD) panel.

2. Description of Related Art

Display viewing angles of LCDs are required to be increasing largely in the market. Currently, the common wide viewing angle technology is multi-domain vertical alignment LCD panel, which adopts an alignment structure to make liquid crystal molecules in different regions to tilt along different directions, thereby achieving the effect of wide viewing angle. However, the disclination of liquid crystal molecules on the periphery of the alignment structure often occurs, resulting in the light leakage. Therefore, an alignment manner of polymer-stabilized alignment (PSA) together with a pixel electrode having a plurality of micro slits to form multi-domain alignment is proposed to solve the problem of the poor display effect of the multi-domain vertical alignment LCD panel.

FIG. 1 shows a pixel structure of the polymer-stabilized alignment LCD panel (PSA-LCD) in the prior art. Referring to FIG. 1, a pixel structure 100 is electrically connected with the scan lines 102 and data lines 104, and the pixel structure 100 includes a first active device 106, a second active device 108, a first pixel electrode 110, and a second pixel electrode 120. The first active device 106 and the second active device 108 are electrically connected to the first pixel electrode 110 and the second pixel electrode 120 respectively. The first pixel electrode 110 and the second pixel electrode 120 are spaced by a main slit 130, such that the first pixel electrode 110 and the second pixel electrode 120 may have different display voltages. Furthermore, the first pixel electrode 110 has a plurality of fine slits 112, and the second pixel electrode 120 has a plurality of fine slits 122.

The disposition of fine slits 112 and 122 makes the liquid crystal molecules tilt along different directions, so as to exhibit a display effect of wide viewing angle. In the orientation of reference coordinate C, the pixel structures 100 is preferably designed to make the liquid crystal molecules located above the first pixel electrode 110 and the second pixel electrode 120 tilt along the directions of 45°, 135°, 225°, and 315°, so as to achieve an optimal display effect. However, the liquid crystal molecules located above the main slit 130 tilt along the directions of 90° and 270°, thus adversely affecting the display effect of the pixel structures 100. The simulation results show that when viewing at a large viewing angle in the horizontal direction, the tilting of liquid crystal molecules along the directions of 90° and 270° may improve the medium and low gray-scale display brightness and decrease the high gray-scale display brightness. Therefore, the tilting of the liquid crystal molecules along the directions of 90° and 270° may aggravate the color washout and the color shift of display images.

Based on the above, the pixel structures 100 may further include a shading layer (not shown) located above the main slit 130, so as to eliminate the color washout and the color shift of display images. However, the design of shading layer limits the display aperture ratio of the pixel structures 100. Therefore, the above problems needs to be overcome while maintaining the display aperture ratio and the wide viewing angle display effect in the wide viewing angle LCD panel.

SUMMARY OF THE INVENTION

Accordingly, the present invention is directed to a polymer-stabilized alignment LCD panel (PSA-LCD), so as to make the wide viewing angle LCD panel have high display aperture ratio.

The present invention provides an LCD panel, which includes a first substrate, a plurality of scan lines, a plurality of data lines, a plurality of pixel structures, a second substrate, and a liquid crystal layer. The scan lines, the data lines, and the pixel structures are disposed on the first substrate. The pixel structures are electrically connected to the corresponding scan lines and data lines. The liquid crystal layer is disposed between the first substrate and the second substrate. Each of the pixel structures includes a first active device, a first pixel electrode, and a second pixel electrode. The first pixel electrode is electrically connected to the first active device. A V-shaped main slit formed between the first pixel electrode and the second pixel electrode has a tip and two branches connected thereto. The tip of the V-shaped main slit directs towards the second pixel electrode, and the edges of the first pixel electrode and the second pixel electrode adjoining each branch are substantially parallel.

In an embodiment of the present invention, a width of each of the branches is about 1 μm to about 12 μm.

In an embodiment of the present invention, the second substrate has an opposite electrode, and a potential difference between the first pixel electrode and the opposite electrode is greater than or equal to the potential difference between the second pixel electrode and the opposite electrode.

In an embodiment of the present invention, each of the first pixel electrodes includes a first interlacing pattern, a plurality of first strip patterns, and a V-shaped connection pattern. The first interlacing pattern has, for example, a first central portion and defines at least four regions. The first strip patterns are substantially located in the regions. The first strip patterns in each of the regions are substantially parallel, and one end of each of the first strip patterns is connected to the first interlacing pattern, and the other end is far away from the first interlacing pattern. The V-shaped connection pattern connects a part of the first strip patterns and the first interlacing pattern, and the V-shaped main slit is located between the V-shaped connection pattern and the second pixel electrode. Moreover, a plurality of the first fine slits are formed between the first interlacing pattern and the first strip patterns of each of the first pixel electrodes.

In an embodiment of the present invention, the LCD panel further includes a plurality of protrusions disposed between the second substrate and the liquid crystal layer and located above the first central portions. The profiles of the protrusions orthographically projected on the first substrate and the profiles of the first central portion are substantially conformal. The distance between the profiles of the protrusions orthographically projected on the first substrate and the profiles of the first central portion is about 5 μm to about 50 μm.

In an embodiment of the present invention, the LCD panel further includes a plurality of spacers disposed between the second substrate and the first substrate, and located above a part of the first central portions. The profiles of the spacers orthographically projected on the first substrate and the profiles of the corresponding first central portions are substantially conformal. The distance between the edge of the profiles of the spacers orthographically projected on the first substrate and the edge of the profiles of the corresponding first central portions is about 5 µm to about 50 µm.

In an embodiment of the present invention, the LCD panel further includes a plurality of first capacitor electrodes disposed on the first substrate and located below the first interlacing patterns. Furthermore, the LCD panel further includes at least one protrusion disposed between the second substrate and the liquid crystal layer and located above the first capacitor electrodes. Moreover, the LCD panel further includes at least one spacer disposed between the second substrate and the first substrate and located above the first capacitor electrodes.

When the LCD panel further includes a plurality of first capacitor electrodes, each of the second pixel electrodes includes a second interlacing pattern and a plurality of second strip patterns. The second interlacing pattern has a second central portion and defines at least four regions, and two neighboring regions are adjoining to the V-shaped main slit. The second strip patterns are located in the regions, and the second strip patterns in each of the regions are substantially parallel. One end of each of the second strip patterns is connected to the second interlacing pattern, and the other end of the second strip patterns is far away from the second interlacing pattern. For example, a plurality of second fine slits are formed between the second interlacing pattern and the second strip patterns of each of the second pixel electrodes. Furthermore, the LCD panel further includes a plurality of protrusions disposed between the second substrate and the liquid crystal layer and located above the second central portions. Moreover, the LCD panel further includes a plurality of spacers disposed between the second substrate and the first substrate, and located above the second central portions.

Furthermore, LCD panel may further include a plurality of second capacitor electrodes disposed on the first substrate and located below the second interlacing pattern. At this time, the LCD panel may further include a plurality of protrusions disposed between the second substrate and the liquid crystal layer, and located above the second capacitor electrodes. Or, the LCD panel may further include a plurality of spacers disposed between the second substrate and the liquid crystal layer, and located above the second capacitor electrodes. In practice, each of the pixel structures may further include a second active device disposed on the first substrate and electrically connected to the second pixel electrode.

In an embodiment of the present invention, each of the second pixel electrodes includes a second interlacing pattern and a plurality of second strip patterns. The second interlacing pattern has a second central portion and defines at least four regions, and two neighboring regions are adjoining to the V-shaped main slit. The second strip patterns are located in the regions, and the second strip patterns in each of the regions are substantially parallel. One end of each of the second strip patterns is connected to the second interlacing pattern, and the other end of the second strip pattern is far away from the second interlacing pattern. For example, a plurality of second fine slits are formed between the second interlacing pattern and the second strip patterns of each of the second pixel electrodes. The LCD panel further includes a plurality of protrusions disposed between the second substrate and the liquid crystal layer, and located above the second central portions. The profiles of the protrusions orthographically projected on the first substrate and the profiles of the second central portion are substantially conformal. Furthermore, the distance between the edge of the profiles of the protrusions orthographically projected on the first substrate and the edge of the profiles of the corresponding second central portions is about 5 µm to about 50 µm. Moreover, the LCD panel may further include a plurality of second capacitor electrodes disposed on the first substrate and located below the second interlacing pattern.

In an embodiment of the present invention, each of the pixel structures further includes a second pixel electrode disposed on the first substrate and electrically connected to the second pixel electrode.

In an embodiment of the present invention, in each of the pixel structures, a ratio of the area of the first pixel electrode to the area of the second pixel electrode is from about 25:75 to about 55:45.

In an embodiment of the present invention, in each of the pixel structures, a ratio of the area of the first pixel electrode to the area of the second pixel electrode is from about 2:8 to about 6:4.

A V-shaped main slit structure is formed between the first pixel electrode and the second pixel electrode in each pixel structure of the LCD panel according to the present invention, so the liquid crystal molecules located above the V-shaped main slit tilt along appropriate direction. In this manner, the LCD panel of the present invention has a wide viewing angle display effect and high aperture ratio.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
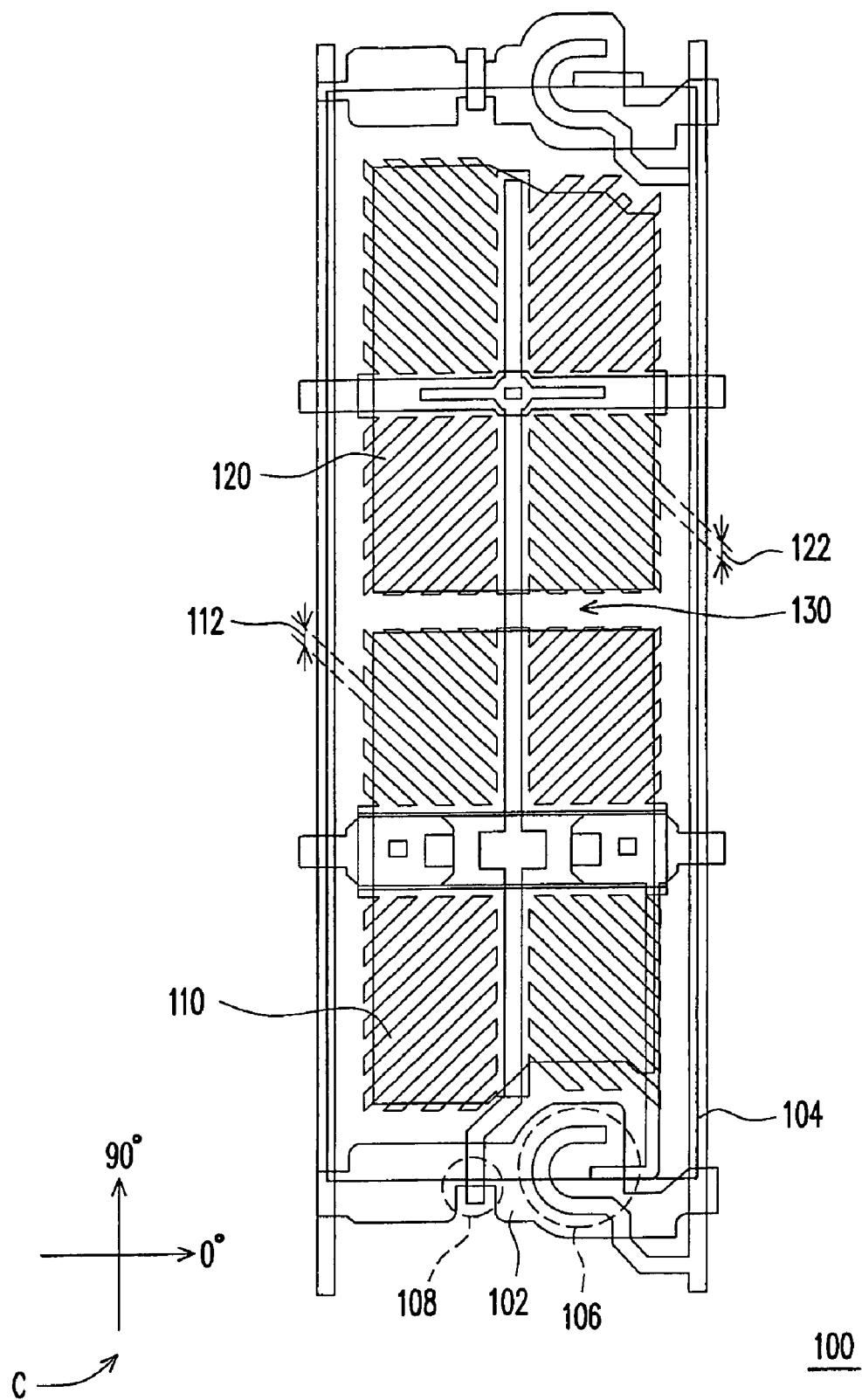
FIG. 1 shows a pixel structure of a polymer-stabilized alignment LCD panel (PSA-LCD) in the prior art.
Figure 2A:
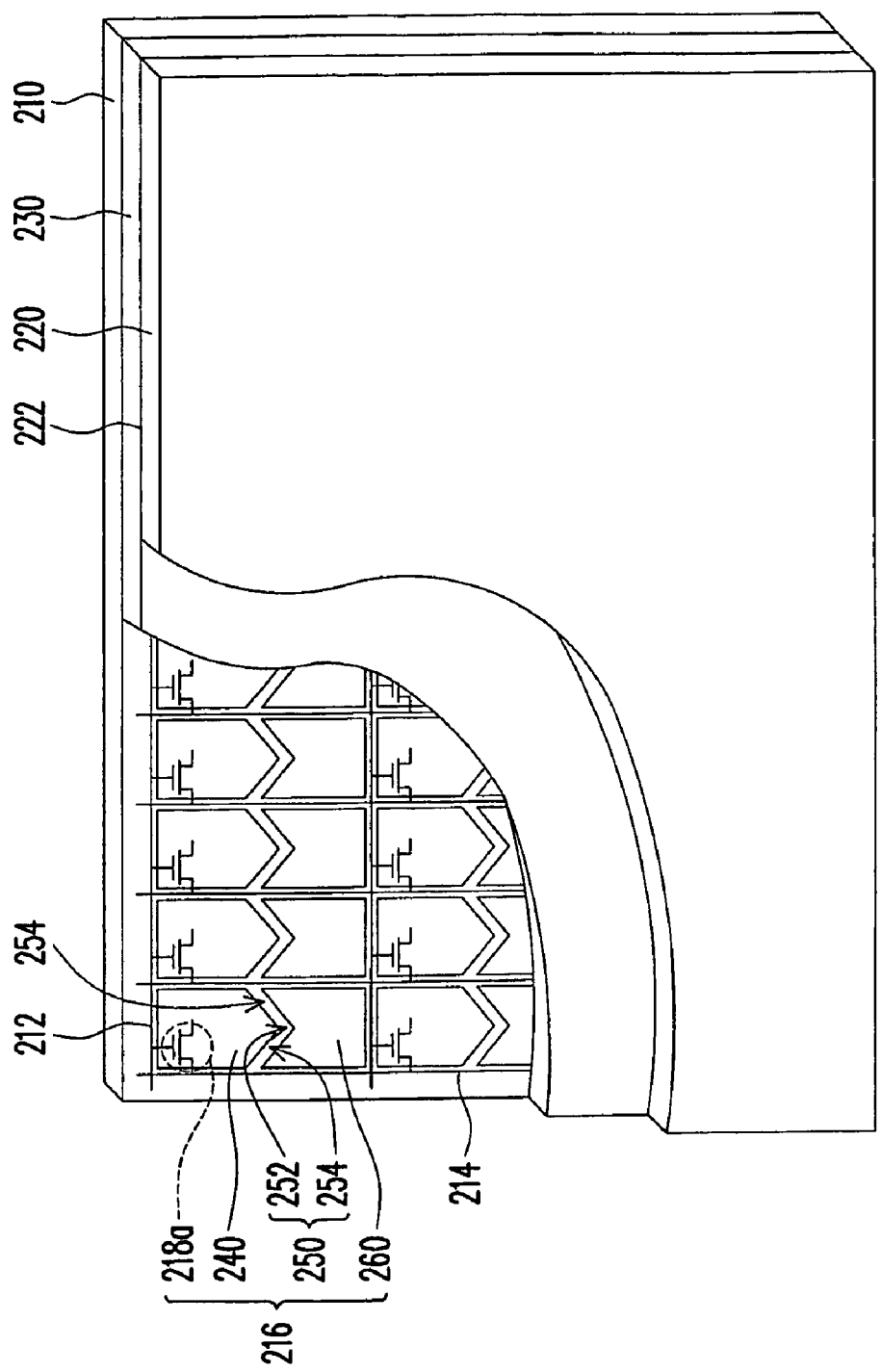
FIG. 2A is a schematic top view of an LCD panel according to a first embodiment of the present invention.
Figure 2B:
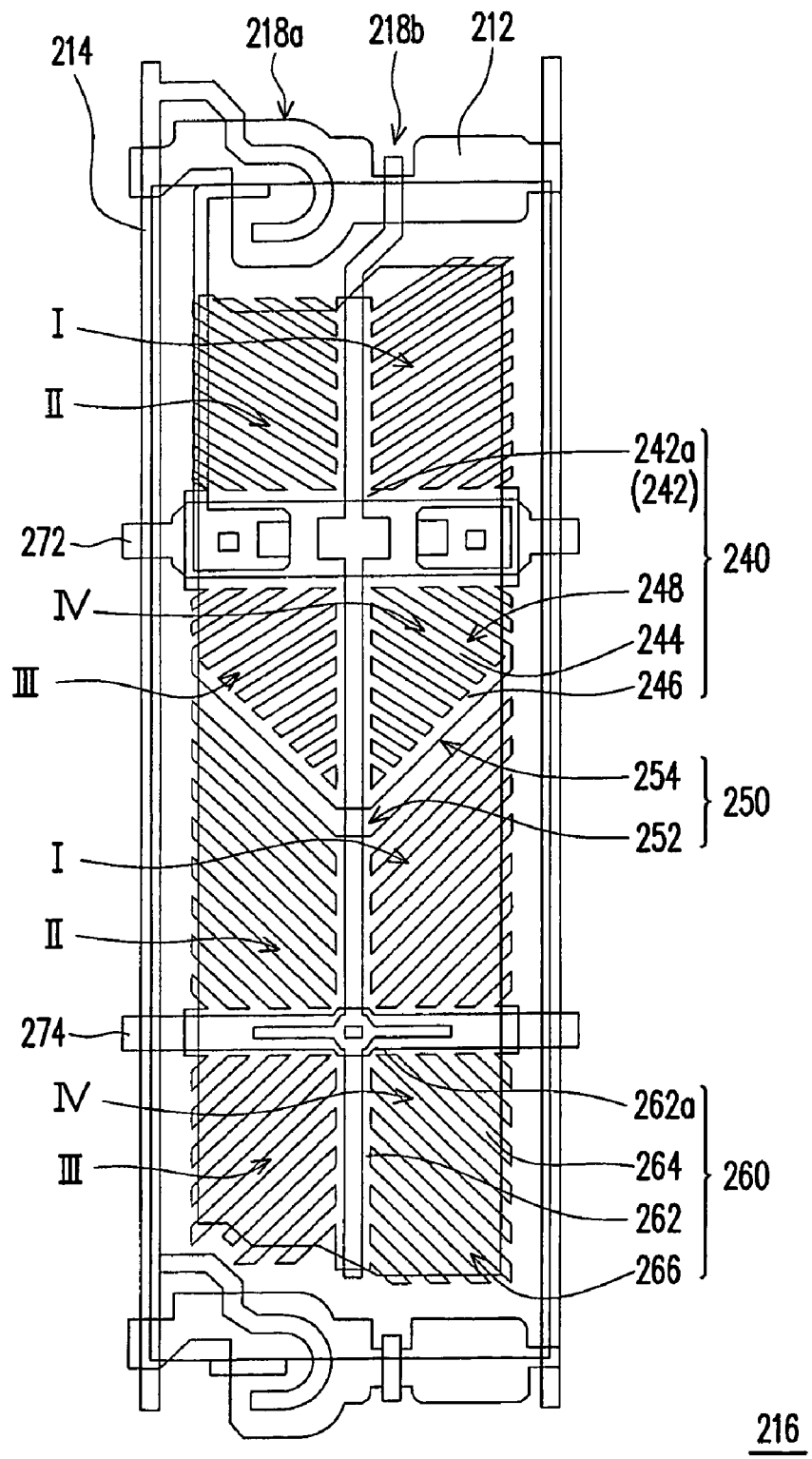
FIG. 2B shows a pixel structure of the LCD panel in FIG. 2A.

FIG. 2A is a schematic top view of a polymer-stabilized alignment liquid crystal display panel (PSA-LCD) according to a first embodiment of the present invention, and FIG. 2B shows a pixel structure of the LCD panel in FIG. 2A. Referring to FIG. 2A, an LCD panel 200 includes a first substrate 210, a plurality of scan lines 212, a plurality of data lines 214, a plurality of pixel structures 216, a second substrate 220, and a liquid crystal layer 230. The scan lines 212, the data lines 214, and the pixel structures 216 are disposed on the first substrate 210. The pixel structures 216 are electrically connected to the corresponding scan lines 212 and data lines 214. The liquid crystal layer 230 is disposed between the first substrate 210 and the second substrate 220.

Each of the pixel structures 216 includes a first active device 218a, a first pixel electrode 240, and a second pixel electrode 260. The first pixel electrode 240 is electrically connected to the first active device 218a. A V-shaped main slit 250 is formed between the first pixel electrode 240 and the second pixel electrode 260 and has a tip 252 and two branches 254 connected to the tip 252. The tip 252 directs towards the second pixel electrode 260. The edges of the first pixel electrode 240 and the second pixel electrode 260 adjoining each branch 254 are substantially parallel. Furthermore, the second substrate 220 has an opposite electrode 222.

In detail, referring to FIG. 2B, in order to improve the quality of the display image, the second pixel electrode 260 may be electrically connected to a second active device 218b disposed on the first substrate 210, such that the first pixel electrode 240 and the second pixel electrode 260 has different display voltages. When the LCD panel 200 is displaying, the potential difference between the first pixel electrode 240 and the opposite electrode 222 is, for example, greater than or equal to the potential difference between the second pixel electrode 260 and the opposite electrode 222, thus exhibiting different display brightness. In practice, in the LCD panel 200, the first substrate 210 may further have a plurality of first capacitor electrodes 272 and a plurality of second capacitor electrodes 274 (only one is shown as an example herein). The first capacitor electrodes 272 and the second capacitor electrodes 274 are respectively located below the first pixel electrode 240 and the second pixel electrode 260, such that the display voltages of the first pixel electrode 240 and the second pixel electrode 260 are different.

As the display voltages of the first pixel electrode 240 and the second pixel electrode 260 are different, the tilting directions of the liquid crystal molecules locating between the first pixel electrode 240 and the second pixel electrode 260 may influence the display quality of the LCD panel 200. Accordingly, the present invention propose a V-shaped main slit 250 formed between the first pixel electrode 240 and the second pixel electrode 260 to eliminate the situation that the display quality is degraded caused by the undesired tilt directions of the liquid crystal molecules. The first pixel electrode 240 and the second pixel electrode 260 are described in more detail hereinafter to illustrate the present invention.

Each of the first pixel electrodes 240 includes a first interlacing pattern 242, a plurality of first strip patterns 244, and a V-shaped connection pattern 246. The first interlacing pattern 242 has, for example, a first central portion 242a and defines at least four regions I, II, III and IV. The first strip patterns 244 are substantially located in regions I, II, III and IV. The first strip patterns 244 in each of the regions I, II, III or IV are substantially parallel. One end of each of the first strip pattern 244 is connected to the first interlacing pattern 242, and the other end is far away from the first interlacing pattern 242. The V-shaped connection pattern 246 connects a part of the first strip patterns 244 and the first interlacing pattern 242. The V-shaped main slit 250 is located between the V-shaped connection pattern 246 and the second pixel electrode 260. Furthermore, a plurality of first fine slits 248 is formed between the first interlacing pattern 242 and the first strip patterns 244 of each of the first pixel electrode 240.

Each of the second pixel electrodes 260 includes a second interlacing pattern 262 and a plurality of second strip patterns 264. The second interlacing pattern 262 has a second central portion 262a and defines at least four regions I, II, III and IV. Two neighboring regions I and II are adjoining to the V-shaped main slit 250. The second strip patterns 264 are located in regions I, II, III and IV, and the second strip patterns 264 in each of the regions I, II, III or IV are substantially parallel. One end of each of the second strip patterns 264 is connected to the second interlacing pattern 262, and the other end is far away from the second interlacing pattern 262. For example, a plurality of second fine slits 266 are formed between the second interlacing pattern 262 and the second strip patterns 264 of each of the second pixel electrodes 260.

In practice, in the pixel structures 216, one side of the first pixel electrode 240 adjacent to the second pixel electrode 260 is connected by a V-shaped connection pattern 246. Therefore, the edge of the first pixel electrode 240 adjacent to the second pixel electrode 260 is closed and defines one edge of the V-shaped main slit 250. Meanwhile, in the second pixel electrode 260, the second strip patterns 264 located in regions I and II respectively just have the same extension direction as the V-shaped connection pattern 246 of the first pixel electrode 240, so as to define the other edge of the V-shaped main slit 250. Furthermore, the width of each branch 254 in the V-shaped main slit 250 is about 1 μm to 12 μm.

When the LCD panel 200 is displaying, the liquid crystal molecules located in regions I, II, III and IV respectively tilt along the extension direction of the first fine slits 248 and the second fine slits 266, for example, in the directions of 45°, 135°, 225°, and 315°, thereby achieving wide viewing angle display effect. Moreover, the liquid crystal molecules located at the junction of the first pixel electrode 240 and the second pixel electrode 260 will not tilt along the direction of 90° or 270° due to the disposition of the V-shaped main slit 250 and will not cause influence on the display effect of the LCD panel 200.

Figure 2C:
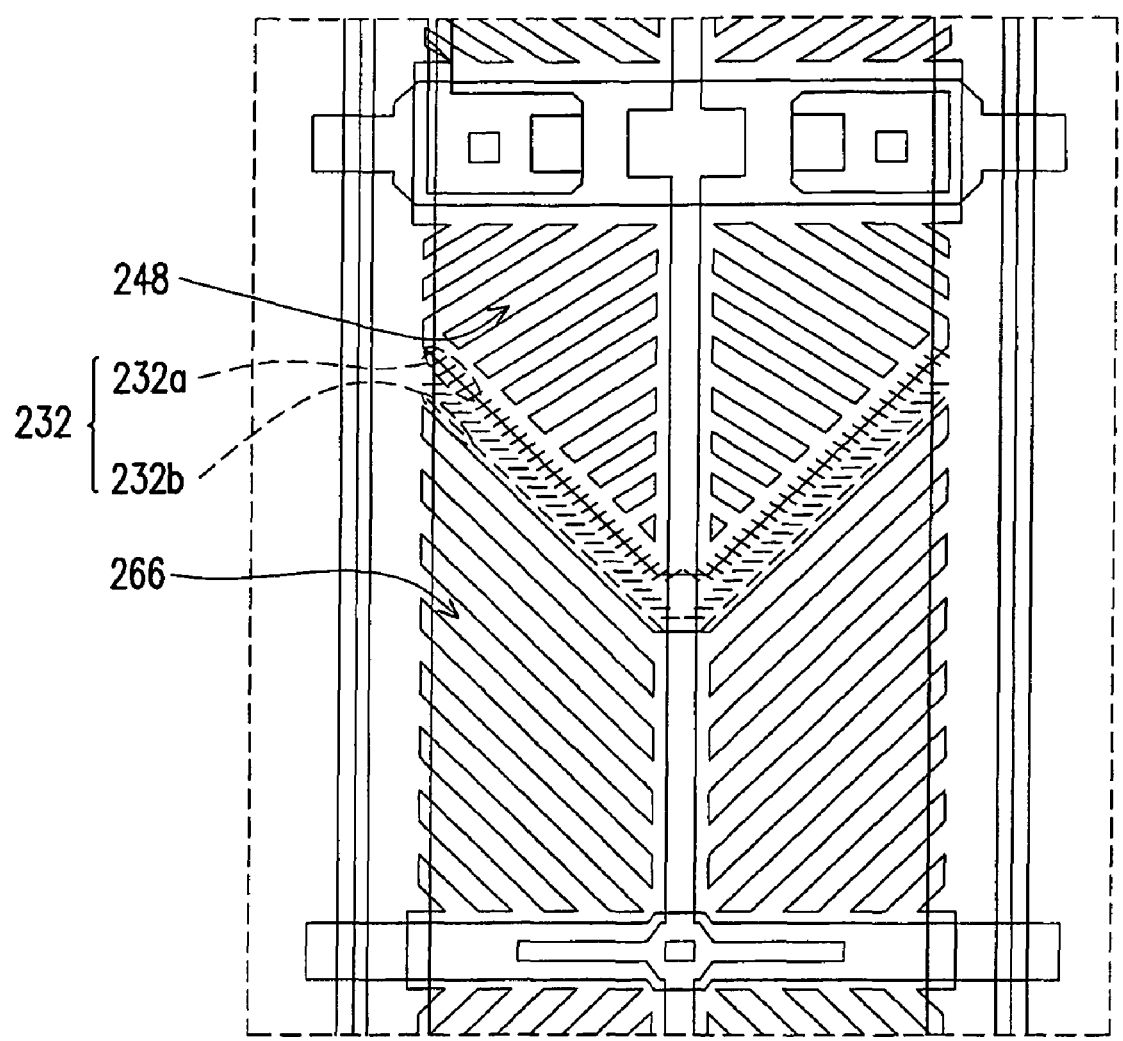
FIG. 2C is a simulation diagram of tilt directions of liquid crystal molecules above a V-shaped main slit.

In detail, FIG. 2C is a simulation diagram of tilt directions of the liquid crystal molecules above the V-shaped main slit. Referring to FIGS. 2B and 2C, the liquid crystal molecules 232a on the edge of the first pixel electrode 240 adjacent to the V-shaped main slit 250 may be influenced by the V-shaped connection pattern 246 to tilt towards the interior of the first pixel electrode 240, i.e., the liquid crystal molecules 232a substantially tilt along the extension direction of the first fine slits 248. Meanwhile, the potential difference between the first pixel electrode 240 and the opposite electrode 222 is, for example, greater than the potential difference between the second pixel electrode 260 and the opposite electrode 222. Therefore, the liquid crystal molecules 232b on the edge of the second pixel electrode 260 adjacent to the V-shaped main slit 250 may be influenced by the direction of the electric field between the second pixel electrode 260 and the first pixel electrode 240 to substantially tilt along the direction of the second strip patterns 264. In other words, the tilt direction of the liquid crystal molecules 232b substantially coincides with the extension direction of the second fine slits 266.

If the extension direction of the first fine slits 248 and the second fine slits 266 is, for example, 45°, 135°, 225°, and 315°, the tilt direction of the liquid crystal molecules 232 in each branch 254 of the V-shaped main slit 250 varies, for example, from 315° to 45° or from 225° to 135°. In this manner, the liquid crystal molecules 232 in the V-shaped main slit 250 is not liable to tilt along the direction of 90° or 270°. Therefore, when viewing the images displayed by the LCD panel 200 in the horizontal direction, the color washout and the color shift from different viewing angles will be alleviated.

As the first pixel electrode 240 and the second pixel electrode 260 may have different display voltages, if the area of the first pixel electrode 240 and the area of the second pixel electrode 260 are appropriately adjusted, different display effects will be obtained. For example, the ratio of the area of the first pixel electrode 240 to the area of the second pixel electrode 260 is from about 2:8 to about 6:4 or from about 25:75 to about 55:45. The practical test shows that when the ratio of the area of the first pixel electrode 240 to the area of the second pixel electrode 260 is about 35:65, a preferred display effect may be displayed. Certainly, the ratio of the area of the first pixel electrode 240 to the area of the second pixel electrode 260 may be different in other embodiment of the present invention to provide a preferred displaying effect.

Figure 3A:
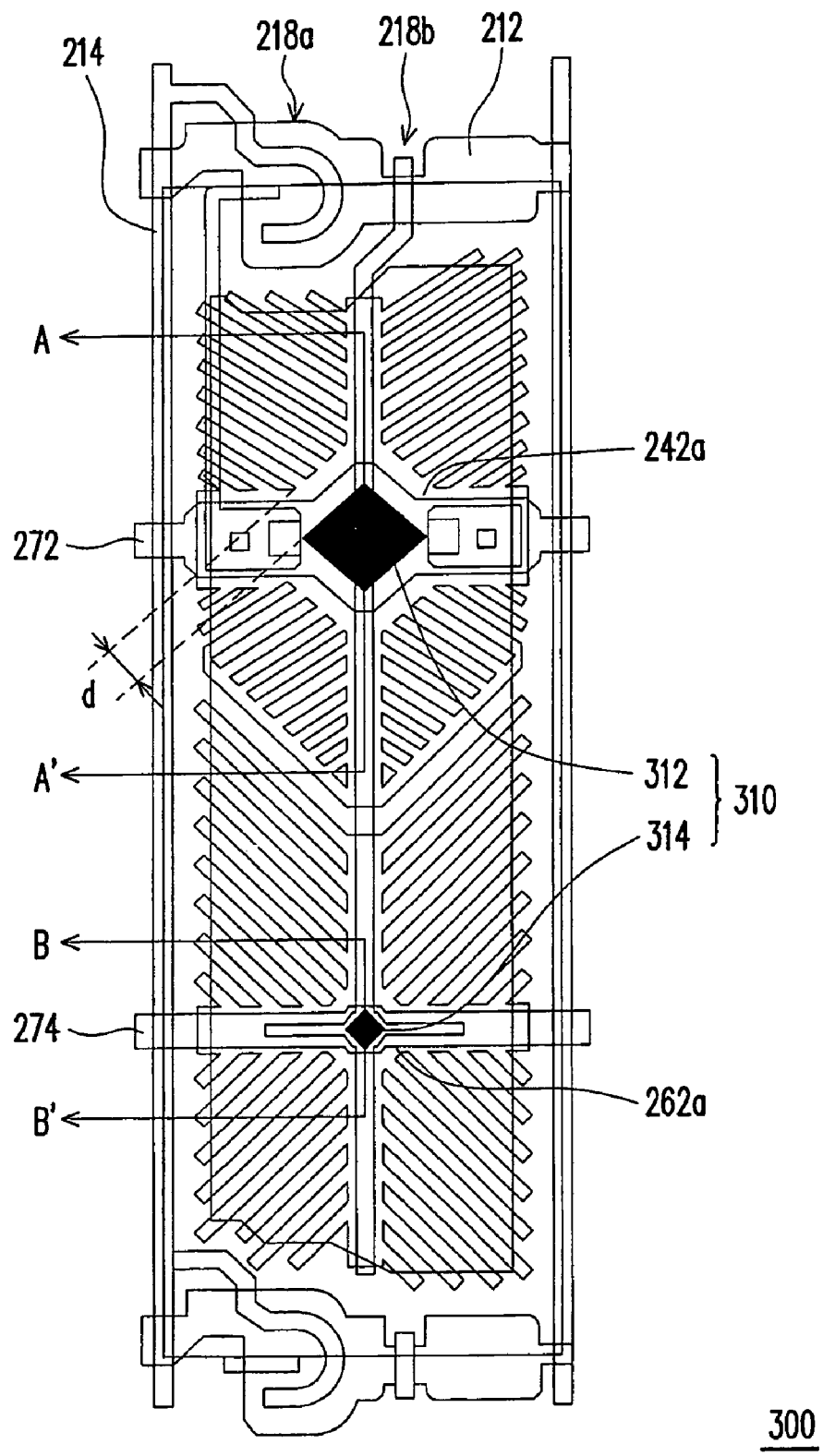
FIG. 3A is a partial schematic top view of an LCD panel according to another embodiment of the present invention.
Figure 3B:
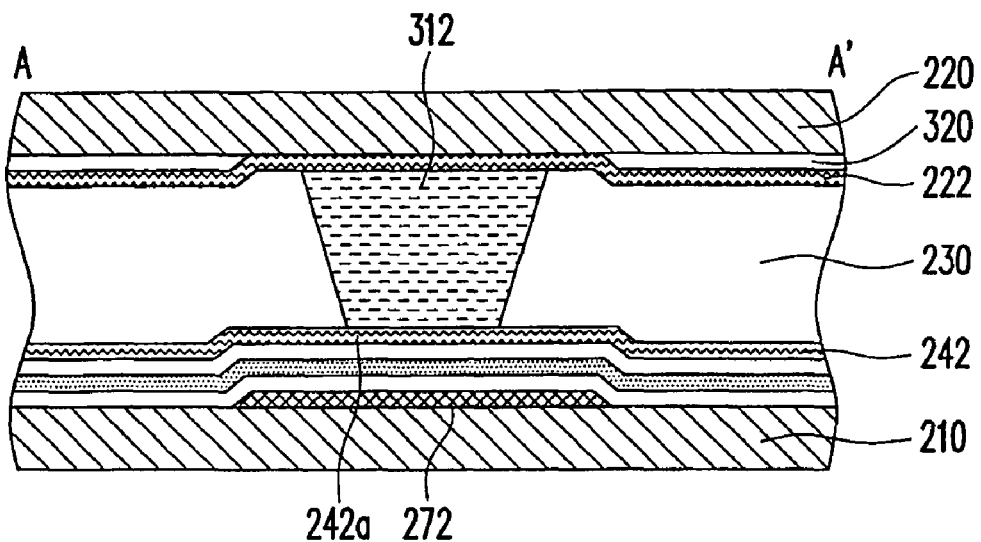
FIGS. 3B and 3C are cross-sectional views taken along lines AA' and BB' in FIG. 3A respectively.
Figure 3C:
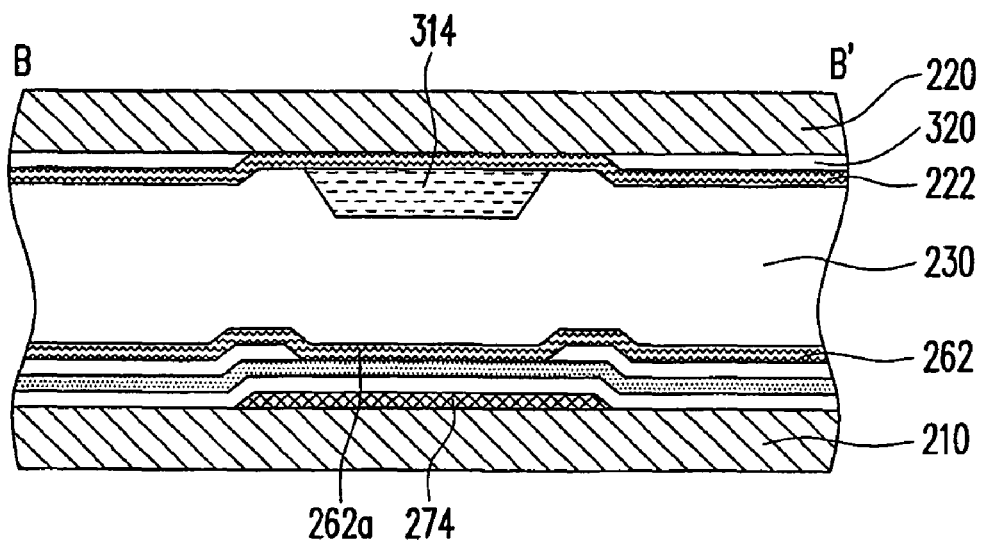

Furthermore, in the LCD panel, protrusions disposed in the pixel structures may provide appropriate nodes to make the tilt directions of the liquid crystal molecules assume a multi-threshold phenomenon, thus enhancing the wide viewing angle display effect. Herein, the present invention proposes another LCD panel with protrusions disposed therein according to an embodiment. FIG. 3A is a partial schematic top view of a PSA-LCD panel according to another embodiment of the present invention, and FIGS. 3B and 3C are cross-sectional views taken along lines AA' and BB' in FIG. 3A respectively. First, referring to FIG. 3A, an LCD panel 300 is substantially similar to the LCD panel 200, and the difference is described as follows. The LCD panel 300 has a plurality of protrusion structures 310 disposed thereon. The protrusion structure 310 disposed on the first pixel electrode 240 is, for example, a spacer 312, and the protrusion structure 310 disposed on the second pixel electrode 260 is, for example, an protrusion 314. Furthermore, the second substrate 220 has, for example, a color filter layer 320 disposed thereon to display multi-color display effect.

Referring to FIGS. 3A and 3B together, the spacer 312 is disposed between the second substrate 220 and the first substrate 210 and located above a part of the first central portions 242a. The spacer 312 is in contact with the second substrate 220 and the first substrate 210 to maintain an appropriate cell gap. The profile of the spacer 312 orthographically projected on the first substrate 210 and the profile of the corresponding first central portions 242a are substantially conformal (as shown in FIG. 3A). The distance d between the edge of the profile of the spacer 312 orthographically projected on the first substrate 210 and the edge of the profile of the corresponding first central portion 242a is about 5 μm to about 50 μm. As the arrangement of the spacer 312 provides a slanted surface for the liquid crystal molecules of the liquid crystal layer 230 to tilt towards the first central portion 242a, the LCD panel 300 has a good display effect. In practice, in order to further improve the display effect of the LCD panel 300, the edge of the spacer 312 projected on the first substrate 210 may be made substantially perpendicular to the tilt directions of the first fine slits 248, so as to make the liquid crystal molecules tilt along the direction of 45°, 135°, 225°, or 315°. Moreover, in order to eliminate the light leakage possibly generated around the spacer 312, the spacer 312 may be disposed above the first capacitor electrode 272.

Furthermore, referring to FIGS. 3A and 3C together, the protrusion 314 is, for example, disposed between the second substrate 220 and the liquid crystal layer 230 and located above the second central portions 262a. The profile of the protrusion 314 orthographically projected on the first substrate 210 and the profile of the second central portion 262a are substantially conformal (as shown in FIG. 3A). Moreover, the distance between the edge of the profile of the protrusion 314 orthographically projected on the first substrate 210 and the edge of the profile of the corresponding second central portion 262a is about 5 μm to about 50 μm. In brief, the arrangement position of the protrusion 314 and the relationship between the protrusion 314 and the second pixel electrode 260 is substantially the same as the arrangement position of the spacer 312 and the relationship between the spacer 312 and the first pixel electrode 240. That is to say, the arrangement of the protrusion 314 contributes to the improvement of the display effect of the LCD panel 300. Furthermore, the protrusion 314 may also be disposed above the second capacitor electrodes 274 correspondingly. Definitely, in other embodiments, the protrusion structure 310 on the first pixel electrode 240 may also be in the form of protrusions, and the protrusion structure 310 on the second pixel electrode 260 may also be in the form of spacers. Or, both of them are in the form of protrusions, or both of them are in the form of spacers.

In view of above, the present invention changes the patterns of the first pixel electrode and the second pixel electrode. Thus, in each pixel structure in the LCD panel, V-shaped main slits are disposed between the electrodes of different display voltages, and the edges of the electrodes on two sides of the V-shaped main slits are parallel. In this manner, the liquid crystal molecules can tilt along the appropriate tilt direction, and thus unnecessary display bright band or color washout will not occur at the slits between the electrodes. Furthermore, the LCD panel of the present invention does not require a shading layer between the first pixel electrode and the second pixel electrode for the unnecessary display bright band. Therefore, the LCD panel of the present invention has a good display aperture ratio and good display effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
   a first substrate;
   a plurality of scan lines, disposed on the first substrate;
   a plurality of data lines, disposed on the first substrate;
   a plurality of pixel structures, disposed on the first substrate and electrically connected to the corresponding scan lines and data lines, and each of the pixel structures comprising:
      a first active device;
      a first pixel electrode, electrically connected to the first active device, and the first pixel electrode comprising:
         a first interlacing pattern, having a first central portion and defining at least four regions;
         a plurality of first strip patterns, located in the regions, wherein the first strip patterns in each of the regions are substantially parallel, one end of each of the first strip patterns is connected to the first interlacing pattern, and the other end of each of the first strip patterns is far away from the first interlacing pattern; and
         a V-shaped connection pattern, connecting a part of the first strip patterns and the first interlacing pattern; and
      a second pixel electrode, wherein a V-shaped main slit formed between the V-shaped connection pattern of the first pixel electrode and the second pixel electrode has a tip and two branches connected thereto, the tip directs towards the second pixel electrode, and wherein the edge of the first pixel electrode and that of the second pixel electrode adjoining each branch are substantially parallel;

a second substrate; and a liquid crystal layer, disposed between the first substrate and the second substrate.

2. The LCD panel as claimed in claim 1, wherein a width of each branch is about 1 μm to about 12 μm.

3. The LCD panel as claimed in claim 1, wherein the second substrate has an opposite electrode, and a potential difference between the first pixel electrode and the opposite electrode is greater than or equal to that between the second pixel electrode and the opposite electrode.

4. The LCD panel as claimed in claim 1, wherein a plurality of first fine slits are formed between the first interlacing pattern and the first strip patterns of each of the first pixel electrodes.

5. The LCD panel as claimed in claim 1, further comprising a plurality of protrusions disposed between the second substrate and the liquid crystal layer, and located above the first central portions.

6. The LCD panel as claimed in claim 1, further comprising a plurality of protrusions disposed between the second substrate and the liquid crystal layer, and located above the first central portions, wherein profiles of the protrusions orthographically projected on the first substrate and that of the first central portions are substantially conformal, and wherein a distance between the edge of the profiles of the protrusions orthographically projected on the first substrate and that of the first central portions is about 5 μm to about 50 μm.

7. The LCD panel as claimed in claim 1, further comprising a plurality of spacers disposed between the second substrate and the first substrate, and located above the first central portions.

8. The LCD panel as claimed in claim 1, further comprising a plurality of spacers disposed between the second substrate and the first substrate, and located above the first central portions, wherein profiles of the spacers orthographically projected on the first substrate and the that of the corresponding first central portions are substantially conformal, and wherein a distance between the edge of the profiles of the spacers orthographically projected on the first substrate and that of the corresponding first central portions is about 5 μm to about 50 μm.

9. The LCD panel as claimed in claim 1, further comprising a plurality of first capacitor electrodes disposed on the first substrate, and located below the first interlacing patterns.

10. The LCD panel as claimed in claim 1, further comprising a plurality of first capacitor electrodes disposed on the first substrate, and located below the first interlacing patterns; and at least one protrusion disposed between the second substrate and the liquid crystal layer, and located above the first capacitor electrodes.

11. The LCD panel as claimed in claim 1, further comprising a plurality of first capacitor electrodes disposed on the first substrate, and located below the first interlacing patterns; and at least one spacer disposed between the second substrate and the first substrate, and located above the first capacitor electrodes.

12. The LCD panel as claimed in claim 9, wherein each of the second pixel electrodes comprises:

a second interlacing pattern, having a second central portion and defining at least four regions, wherein two neighboring regions among the regions are adjoining to the V-shaped main slit; and a plurality of second strip patterns, located in the regions, wherein the second strip patterns in each of the regions are substantially parallel, one end of each of the second strip patterns is connected to the second interlacing pattern, and the other end of each of the second strip patterns is far away from the second interlacing pattern.

13. The LCD panel as claimed in claim 12, wherein a plurality of second fine slits are formed between the second interlacing pattern and the second strip patterns of each of the second pixel electrodes.

14. The LCD panel as claimed in claim 1, further comprising:

a plurality of first capacitor electrodes disposed on the first substrate, and located below the first interlacing patterns; and a plurality of protrusions disposed between the second substrate and the liquid crystal layer, and located above the second central portions, wherein each of the second pixel electrodes comprises:

a second interlacing pattern, having a second central portion and defining at least four regions, wherein two neighboring regions among the regions are adjoining to the V-shaped main slit; and a plurality of second strip patterns, located in the regions, wherein the second strip patterns in each of the regions are substantially parallel, one end of each of the second strip patterns is connected to the second interlacing pattern, and the other end of each of the second strip patterns is far away from the second interlacing pattern.

15. The LCD panel as claimed in claim 1, further comprising:

a plurality of first capacitor electrodes disposed on the first substrate, and located below the first interlacing patterns; and a plurality of spacers disposed between the second substrate and the first substrate, and located above the second central portions, wherein each of the second pixel electrodes comprises:

a second interlacing pattern, having a second central portion and defining at least four regions, wherein two neighboring regions among the regions are adjoining to the V-shaped main slit; and a plurality of second strip patterns, located in the regions, wherein the second strip patterns in each of the regions are substantially parallel, one end of each of the second strip patterns is connected to the second interlacing pattern, and the other end of each of the second strip patterns is far away from the second interlacing pattern.

16. The LCD panel as claimed in claim 12, further comprising a plurality of second capacitor electrodes disposed on the first substrate, and located below the second interlacing patterns.

17. The LCD panel as claimed in claim 12, wherein each of the pixel structures further comprises a second active device disposed on the first substrate and electrically connected to the second pixel electrode. 18. The LCD panel as claimed in claim 1, wherein each of the second pixel electrodes comprises:

18. The LCD panel as claimed in claim 1, wherein each of the second pixel electrodes comprises:

a second interlacing pattern, having a second central portion and defining at least four regions, wherein two neighboring regions among the regions are adjoining to the V-shaped main slit; and a plurality of second strip patterns, located in the regions, wherein the second strip patterns in each of the regions are substantially parallel, one end of each of the second strip patterns is connected to the second interlacing pattern, and the other end of each of the second strip patterns is far away from the second interlacing pattern.

19. The LCD panel as claimed in claim 1, wherein in each of the pixel structures, a ratio of the area of the first pixel electrode to the area of the second pixel electrode is from 25:75 to 55:45.

20. The LCD panel as claimed in claim 1, wherein in each of the pixel structures, a ratio of the area of the first pixel electrode to the area of the second pixel electrode is from 2:8 to 6:4.

* * * * *